US008465653B2

(12) United States Patent
Matousek et al.

(10) Patent No.: US 8,465,653 B2
(45) Date of Patent: Jun. 18, 2013

(54) MARINE WASTEWATER TREATMENT

(75) Inventors: Rudolf Matousek, Richmond, TX (US);
Dana Casbeer, Angleton, TX (US);
David Hill, Sugar Land, TX (US);
Rubin Bariya, Houston, TX (US)

(73) Assignee: Severn Trent De Nora, LLC, Sugar Land, TX (US)

( * ) Notice: Subject to any disclaimer, the term of this patent is extended or adjusted under 35 U.S.C. 154(b) by 735 days.

(21) Appl. No.: 12/621,291

(22) Filed: Nov. 18, 2009

(65) Prior Publication Data

US 2010/0122913 A1    May 20, 2010

Related U.S. Application Data

(60) Provisional application No. 61/199,676, filed on Nov. 19, 2008, provisional application No. 61/142,794, filed on Jan. 6, 2009.

(51) Int. Cl.
    *C02F 1/46*    (2006.01)
(52) U.S. Cl.
    USPC ...... 210/748.17; 210/754; 205/755; 205/756; 205/757
(58) Field of Classification Search
    USPC .................................................. 210/748.17
    See application file for complete search history.

(56) References Cited

U.S. PATENT DOCUMENTS

| | | | |
|---|---|---|---|
| 4,197,200 A | | 4/1980 | Alig |
| 4,292,175 A | * | 9/1981 | Krause et al. ............ 210/192 |
| 4,431,549 A | | 2/1984 | Highstreet et al. |
| 4,481,114 A | | 11/1984 | Riise |
| 5,032,293 A | | 7/1991 | Tuite |
| 5,336,398 A | | 8/1994 | Russell et al. |
| 5,364,509 A | | 11/1994 | Dietrich |
| 5,961,827 A | | 10/1999 | Bahr |
| 6,106,703 A | | 8/2000 | Nassef |
| 6,135,293 A | | 10/2000 | Herbst et al. |
| 6,207,047 B1 | | 3/2001 | Gothreaux |
| 7,306,724 B2 | | 12/2007 | Gordon |

(Continued)

FOREIGN PATENT DOCUMENTS

| | | |
|---|---|---|
| CN | 1279651 A | 1/2001 |
| JP | 2006035178 A | 2/2006 |

OTHER PUBLICATIONS

USPTO Office Action dated Jul. 3, 2012 for co-pending U.S. Appl. No. 12/648,041.
Written Opinion, Mar. 22, 2010, International Searching Authority.
Written Opinion, International Searching Authority.

(Continued)

*Primary Examiner* — Tony G Soohoo
*Assistant Examiner* — Peter Keyworth
(74) *Attorney, Agent, or Firm* — D'Ambrosio & Menon, PLLC

(57) ABSTRACT

Methods and systems for treating wastewater. Wastewater slurry collected in a tank is routed by a macerator pump. The macerated slurry is piped to an electrolytic cell to oxidize and disinfect it. The slurry is then piped to an electrocoagulation cell. Suspended solid particles are flocculated in the electrocoagulation cell. The flocculated slurry is routed to a primary settling tank for separation of sludge and a substantially clarified supernatant. The supernatant is piped to a secondary clarifying tank to facilitate further separation of the sludge. The sludge is discharged to a sludge collection tank. The turbidity levels of the sludge discharged is continually monitored. When the turbidity level equals a pre-determined low value, the sludge discharge is stopped. The substantially clarified supernatant may be discharged as an effluent following dechlorination.

15 Claims, 1 Drawing Sheet

U.S. PATENT DOCUMENTS

| | | | |
|---|---|---|---|
| 2002/0020631 A1* | 2/2002 | Gavrel et al. | 205/752 |
| 2002/0130090 A1* | 9/2002 | Symens et al. | 210/753 |
| 2004/0099607 A1 | 5/2004 | Leffler et al. | |
| 2005/0016931 A1 | 1/2005 | Keller et al. | |
| 2005/0045534 A1* | 3/2005 | Kin et al. | 210/96.1 |
| 2005/0109701 A1 | 5/2005 | Morse et al. | |
| 2006/0006114 A1 | 1/2006 | Deskins | |
| 2007/0068826 A1 | 3/2007 | Morkovsky et al. | |
| 2007/0095734 A1 | 5/2007 | Lee, Jr. | |
| 2007/0158276 A1 | 7/2007 | Markle | |
| 2008/0135478 A1 | 6/2008 | Zuback et al. | |
| 2008/0149485 A1 | 6/2008 | Childers et al. | |
| 2011/0155564 A1* | 6/2011 | Oifman | 204/230.2 |

OTHER PUBLICATIONS

SIPO Office Action dated Apr. 8, 2013 co-pending Chinese counterpart application No. 200980145998.1.
JPO Office Action dated Nov. 13, 2012 for Japanese co-pending counterpart patent application No. 2011-534734.
USPTO Final Office Action dated Nov. 23, 2012 for co-pending U.S. Appl. No. 12/648,041.
SIPO Office Action dated 10-31-120 for Chinese co-pending counterpart patent application No. 201080003842.2.
"Teknofanghi Sludge Dewatering Equipments" May 9, 2008; http://www.teknofanghi.com.

* cited by examiner

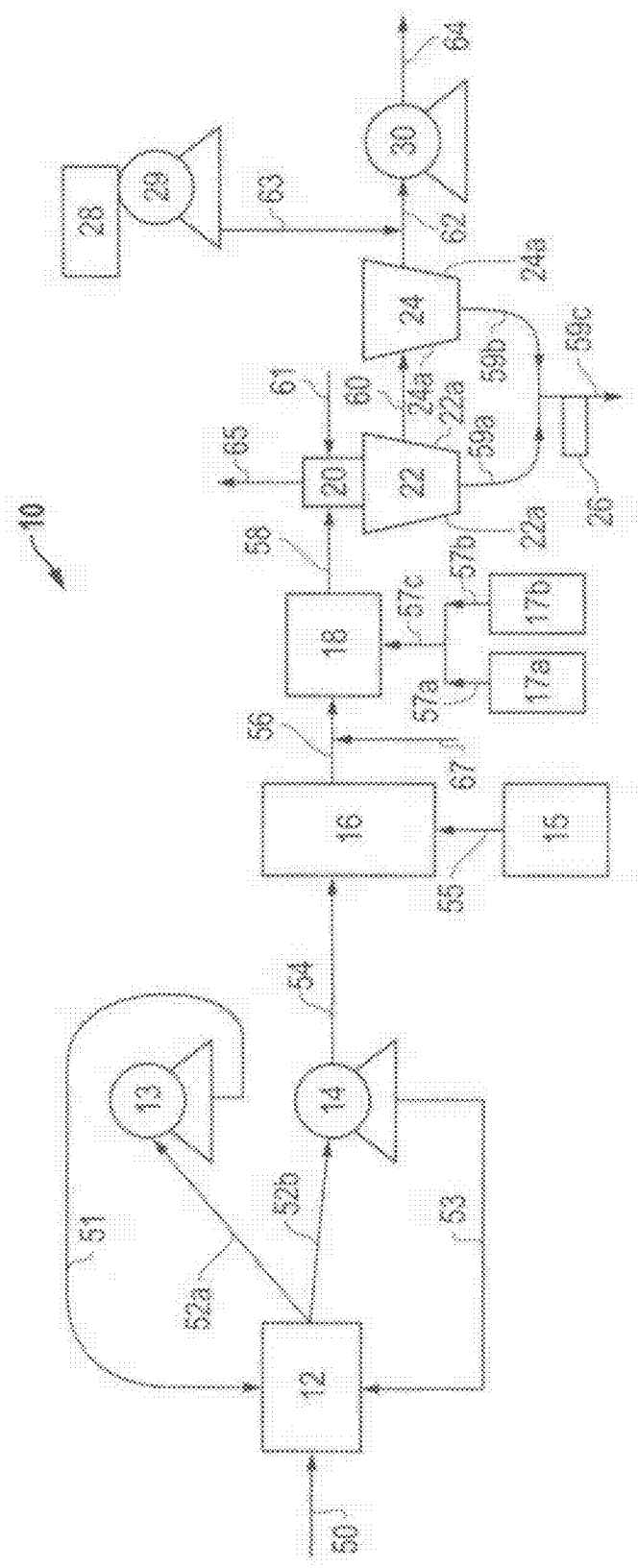

MARINE WASTEWATER TREATMENT

PRIORITY

The present invention claims the benefit of the filing date of U.S. provisional application Ser. No. 61/199,676, filed Nov. 19, 2008. The present invention is also related to and claims priority to U.S. provisional application Ser. No. 61/142,794, filed Jan. 6, 2009.

BACKGROUND AND SUMMARY

The present invention relates generally to wastewater treatment, and in particular to the on-site treatment and purification of marine wastewater. One or more embodiments of the present invention relate to methods and systems for treating wastewater onboard a marine vessel and/or stationary offshore platforms.

In one embodiment of the invention, a method for treating wastewater comprises pumping wastewater slurry into a wastewater collection tank. The wastewater comprises raw sewage, black water, gray water, galley waste and combinations thereof. The wastewater slurry further comprises suspended solid particles, organic and inorganic matter, bacteria and entrained gas. A wastewater level sensor installed on the wastewater collection tank monitors the wastewater level in the wastewater collection tank. When the wastewater slurry reaches a predetermined upper threshold level, the sensor triggers automatic commencement of operation. The pumping of the wastewater slurry may be stopped when the wastewater level falls below a predetermined lower threshold level. The wastewater slurry is routed by a macerator pump for maceration of the suspended solid particles. During maceration, the solid particles are finely ground, thereby resulting in smaller sized particles occupying a larger surface area. A stream of macerated slurry may be diverted back to the wastewater collection tank. The remaining macerated slurry is piped to an electrolytic cell. The electrolytic cell oxidizes and disinfects the macerated slurry using a controlled volume of seawater or brine. Since the finely macerated particles occupy a larger surface area, oxidation and disinfection of the macerated slurry in the electrolytic cell is significantly improved. A defoaming agent is added to the oxidized and disinfected slurry prior to piping it to an electrocoagulation cell. The disinfected suspended solids may be agglomerated or flocculated in the electrocoagulation cell. The flocculated slurry is routed to a primary settling tank for separation of a floc-containing sludge and a substantially clarified supernatant. The substantially clarified supernatant is piped to a secondary clarifying tank to facilitate further separation of the sludge and the substantially clarified supernatant. The sludge from the settling and clarifying tanks is precipitated at the bottom of the tanks and is discharged. The turbidity level of the discharged sludge is continually monitored. When the turbidity level equals a pre-determined low value, the sludge discharge is stopped by automatically closing the valves on the sludge discharge pipe. The substantially clarified supernatant may discharged as a treated effluent.

The macerated slurry stream diverted back to the wastewater collection tank may be mixed with the wastewater slurry in the collection tank. This maintains a homogeneous blend within the wastewater collection tank. In one embodiment, a mixing pump may be positioned adjacent the macerator pump to continuously mix and recirculate the macerated slurry stream with the wastewater slurry in the wastewater collection tank.

A controlled volume of seawater may be mixed with the macerated slurry as it enters the electrolytic cell. The volume of seawater introduced may be dependent on the specific treatment capacity of the marine wastewater treatment system. The macerated slurry may be oxidized and disinfected by an electrochemical reaction occurring inside the electrolytic cell. In one embodiment of the invention, the macerated slurry may be contacted with an oxidizing agent within the electrolytic cell.

The oxidized and disinfected slurry is passed into an electrocoagulation cell for agglomerating the macerated solids and other suspended solids. The electrocoagulation cell may enhance the disinfected wastewater stream with metal particles that serve as nucleation sites forming a flocculation with organic matter. The electrodes in the electrocoagulation cell may get coated with the solid particles and floc with continual use. In one embodiment of the invention, the electrocoagulation cell is periodically subjected to an automated air and water purge. The purge flushes the coated particulate contaminants from the electrodes. The purge contents are piped to the primary settling tank.

The substantially clarified supernatant may be treated with one or more chemicals prior to discharge to neutralize residual chlorine to less than 0.5 mg/L. In one embodiment of the invention, an optimal amount of a reducing agent is injected into the substantially clarified supernatant using a metering pump. The reducing agent may be selected from the group consisting of sodium bisulfite, sodium sulfite, sodium thiosulfate and sulfur dioxide.

In one or more embodiments of the invention, the discharged effluent may comprise less than 25 mg/L Biological Oxygen Demand (BOD), less than 35 mg/L Total Suspended Solids (TSS), less than 120 mg/L Chemical Oxygen Demand (COD) and less than 100 cfu/100 ml coli form.

In another embodiment of the invention, the flocculated slurry from the electrocoagulation cell and sludge and the particulate contaminants dislodged during the automated air and water purge are piped to a degasification chamber. The gases produced during the electrolysis reaction and other residual gases emitted from the slurry are diluted with ambient air and vented to the atmosphere. An electric air blower may be used to force the ambient air into the vent lines.

In another embodiment of the invention, the flocculated slurry exiting the electrocoagulation cell may be discharged into a polymerization tank. One or more cationic polymers may be introduced in the flocculated slurry to form polymerized agglomerated solid clusters. The polymerized agglomerated solid clusters may be filtered using a filtration unit.

In another embodiment of the invention, a system for treating wastewater comprises a wastewater collection tank, a macerator pump capable of grinding solids suspended in the wastewater, a mixing pump adjacent the macerator pump, an electrolytic cell, the electrolytic cell comprising a reaction chamber, an anode disposed within the reaction chamber and a cathode disposed within the reaction chamber, and means for providing power to the electrolytic cell, an electrocoagulation cell that is in fluid communication with the electrolytic cell, a settling tank adjacent the electrocoagulation cell, a clarifying tank connected to the settling tank, a turbidimeter for detecting turbidity levels of the discharged sludge, a dechlorination unit comprising a chemical injection pump or metering pump, and an effluent discharge pump. In one embodiment of the invention, the settling tank is connected to a degasification chamber. The degasification chamber comprises an electric blower and venting means to permit release of diluted gases produced during the electrolysis. In one embodiment of the invention, an optional sludge collection tank is positioned beneath the settling and clarifying tanks.

In one embodiment of the invention, the wastewater treatment system comprises a rigid base frame, wherein the rigid base frame is configured and disposed to carry the weight of the wastewater treatment system. In another embodiment of the invention, the wastewater treatment system comprises an air and water purger connected to the electrocoagulation cell. In yet another embodiment of the invention, a seawater supply source is connected the electrolytic cell.

BRIEF DESCRIPTION OF THE DRAWINGS

FIG. 1 is a flow diagram illustrating a wastewater treatment system according to one embodiment of the present invention.

DETAILED DESCRIPTION

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

Various terms as used herein are shown below. To the extent a term used in a claim is not defined below, it should be given the broadest definition persons in the pertinent art have given that term as reflected in printed publications and issued patents at the time of filing.

Embodiments of the invention relate to methods and systems for the treatment of marine wastewater onboard a vessel and/or stationary offshore platforms. As used herein, the term "onboard" refers to purification within the same facility as the wastewater is produced (in contrast to treatment of such water at a site remote from the site of generation, such as at a municipal water treatment plant).

FIG. 1 illustrates a specific, non-limiting embodiment, exemplifying a system 10 for treating marine wastewater onboard a marine vessel or a stationary offshore platform. The system 10 comprises a wastewater collection tank 12, a macerator pump 14, a mixing pump 13, an electrolytic cell 16, an electrocoagulation cell 18, a settling tank 22, a clarifying tank 24, a dechlorination unit 28 comprising a chemical injection pump 29 and an effluent discharge pump 30. The wastewater is subjected to treatment and purification in the wastewater treatment system 10. The wastewater treatment system 10 is supported and disposed on a common rigid base (not shown). After purification, the dechlorinated effluent may be discharged 64 overboard a marine vessel into the open waters. The one or more embodiments of the present invention may produce dechlorinated wastewater discharge having no more than 100 cfu/100 ml coliform, 35 mg/L Total Suspended Solids (TSS), 25 mg/L Biochemical Oxygen Demand (BOD) and 120 mg/L Chemical Oxygen Demand (COD). The marine wastewater treatment system 10 may range in treatment capacities from 3.0 to 65.0 cubic meters/day. The marine wastewater treatment system 10 may require a small installation floor space or occupy a small system footprint. The marine wastewater system 10 may be capable of operating 24×7 with continuous collection and treatment of the collected wastewater. In one embodiment of the invention, the marine wastewater treatment system 10 may be capable of being operated automatically with limited operator intervention.

Marine wastewater streams generally include sewage, black water, gray water and combinations thereof. As used herein, the term "black water" refers to water contaminated with human waste that comprises coliform and other bacilli. As used herein, the term "gray water" refers used water absent human waste, such as water from sinks and showers. Generally, marine wastewater is composed of both toxic and non-toxic organic and inorganic contaminants, micro and macro suspended solid contaminants comprising cellulose, sand, grit, human biomass, and emulsions and gases. One of the most commonly measured constituents of wastewater is the biochemical oxygen demand, or BOD. The amount of oxygen required for microbes to break down organic contaminants is known as the biochemical oxygen demand or BOD. The five-day BOD, or $BOD_5$, is measured by the quantity of oxygen consumed by microorganisms during a five-day period, and is the most common measure of the amount of biodegradable organic material in, or strength of, sewage. Sewage high in BOD can deplete oxygen in receiving waters, causing fish kills and ecosystem changes.

Onboard treatment of wastewater is generally utilized at those locations where there is limited access to a municipal water treatment plant or equivalent facility. Examples of such locations are ships and off-shore drilling platforms.

Referring back to FIG. 1, wastewater slurry is piped 50 into a wastewater collection tank 12. The wastewater collection tank 12 incorporates a wastewater level sensor (not shown) to determine wastewater level. This level sensor may automatically initiate the start and stop sequences of the wastewater treatment system 10 when the wastewater treatment system 10 is set to an automatic mode and pre-determined threshold levels are reached. In another embodiment, wastewater treatment may be manually commenced.

The wastewater slurry may be routed 52b by a macerator pump 14 when the level sensor detects a pre-determined upper threshold level of wastewater in the wastewater collection tank 12. The macerator pump 14 finely grinds solids suspended in the wastewater slurry to reduce their particle size. The reduced particles occupy a significantly larger area in the slurry. A stream of macerated slurry may be diverted back 53 to the wastewater collection tank 12. The macerated slurry stream is continually mixed with the wastewater slurry in the wastewater collection tank 12 to form a homogeneous blend. A mixing pump 13 is positioned adjacent the macerator pump 14. The wastewater slurry and the macerated wastewater slurry may routed by 52a the mixing pump 13. The mixing pump 13 operates continuously to recirculate 51 the wastewater slurry and the macerated wastewater slurry in the wastewater collection tank 12 thereby, maintaining a homogeneous wastewater blend.

The remaining macerated slurry is piped 54 to an electrolytic cell 16 through a calibrated orifice plate to produce oxidized and disinfected slurry that may be non-hazardous, and hence does not require operators to be exposed to dangerous bacteria such as E. Coli. The electrolytic cell 16 may comprise a reaction chamber, an anode disposed within the reaction chamber, a cathode disposed within the reaction chamber and means for passing a direct current between the anode and the cathode. It is contemplated that any electrolytic cell known to one skilled in the art may be used as the electrolytic cell in the embodiments described herein.

The macerated slurry may contact an oxidizing agent source within the electrolytic cell 16 to disinfect and neutralize the coliform present therein and reduce BOD. Since the macerated particles occupy a larger surface area within the electrolytic cell 16, oxidation and disinfection is significantly enhanced. In one embodiment of the invention, the oxidizing agent is generated by seawater or brine. The oxidizing agent may be produced by passing seawater 55 through the electrolytic cell 16 in the presence of the macerated slurry. A controlled volume of seawater may be mixed with the macerated slurry as it is pumped 54 through a calibrated orifice plate to the electrolytic cell 16 or, alternatively the controlled volume of seawater may be separately introduced into the electrolytic cell 16 via a strainer and flow controller (not shown). This flow controller limits the seawater flow to a predetermined value based on the specific treatment capacity of the wastewater treatment system 10.

The seawater may contact the macerated slurry in a ratio of at least about 1:1. In alternative embodiments of the invention, a brine solution, comprising water having enough salt to complete the electrolysis and form an oxidant, may be mixed with the macerated slurry. Upon contact with the macerated slurry, the oxidizing agent provides a reaction mixture having a pH of from about 6 to about 9 or from about 6.5 to about 8, for example.

The macerated slurry may be oxidized and disinfected by means of an electrochemical reaction in the electrolytic cell 16. The electrochemical reaction is the result of D.C. voltage applied to specially designed anode and cathode plates (electrodes) within the electrolytic cell 16. The macerated slurry piped 54 from the macerator pump 14 flows between charged electrodes. The seawater provides sodium chloride and water and acts as an electrolyte for DC current flow between the anode and cathode plates. The chloride salts of the seawater are decomposed by electrolysis to form sodium hypochlorite and trace amounts of mixed oxidants. The electrochemical reaction and the resulting production of oxidants kill harmful coliform bacteria and oxidize the organic compounds in the macerated slurry. One pass through the electrolytic cell 16 may kill nearly 100% of resident bacteria and oxidize between 90 to 95% of the organic compounds found in wastewater.

The electrical power required to operate the electrolytic cell 16 is derived from the internal D.C. power supply of the marine wastewater treatment system 10. One or more embodiments of the marine wastewater treatment system 10 have a specific, fixed current associated with its electrolytic cell 16. The amount of D.C. current applied to the electrolytic cell 16 determines the amount of sodium hypochlorite produced. During electrolysis, small amounts of hydrogen and other gases may also be produced as byproducts. The gases may be emitted from or entrained in the oxidized and disinfected slurry.

In another embodiment of the invention, the oxidizing agent may continue to be contacted with the macerated slurry in another vessel, such as a conduit or tank (not shown). The contact time may be as little as 2 minutes, for example.

The oxidized and disinfected slurry may include a minimal amount of residual oxidizing agent. In one embodiment, the oxidized and disinfected slurry may include from about 1 mg/L to about 250 mg/L residual oxidizing agent and residual chlorine.

In another embodiment of the invention, the macerated slurry may be oxidized by any method known to one skilled in the art, such as contacting the macerated slurry with ozone within an oxidizing cell. It is to be noted that the oxidation within the oxidizing cell utilizes an oxidizing agent that is stronger than the oxidizing agent utilized in the electrolytic cell 16.

The oxidized and disinfected slurry is piped 56 to an electrocoagulation cell 18. The oxidized and disinfected slurry is subjected to electrolytic coagulation resulting in the flocculation or agglomeration of the solid particles suspended therein. Electrocoagulation cells are known in the art and using a variety of anode and cathode geometries, including electrode plates, balls, fluidized bed spheres, wire mesh, rods and tubes. The electrocoagulation process is based on scientific principles involving responses of wastewater contaminants to strong electrically induced oxidation and reduction reactions. This process may take out over 99% of some heavy metal cations and may also electrocute microorganisms in the water. It may also precipitate charged colloids and remove significant amounts of other ions, colloids, and emulsions.

The electrocoagulation cell 18 may be used in line with the electrolytic cell 16. In one embodiment, the electrocoagulation cell 18 may be operated in a vertical configuration. This allows gas to escape while providing a gas lift through the electrocoagulation cell 18 for reduced flow fluctuations and reduced operating voltage.

In one embodiment of the invention, direct electrical current is introduced via electrode plates into the oxidized and disinfected slurry collected within the electrocoagulation cell 18. The electrodes may be made of iron or aluminum. Metal ions are split off the electrodes and are sacrificed into the oxidized and disinfected slurry. These metal ions may form metal oxides that electromechanically attract solid particles that have been destabilized. As this occurs, the solids form charged entities that agglomerate or flocculate and may separate from a supernatant fluid. Residual chlorine in the slurry may also be electrolytically destroyed in the electrocoagulation cell 18.

Some solid particles and contaminants may accumulate in the electrocoagulation cell 18 with time. In one embodiment of the invention, the electrocoagulation cell 18 may be connected to an air purger 17a and a water purger 17b. The electrocoagulation cell 18 may be periodically cleansed with an automated air purge 57a, a water purge 57b or a combined air and water purge 57c to flush out the particulate contaminants accumulated on the electrodes. The automated combined air and water purge 57c may be done during each cycle when the wastewater collection tank 12 may be filled or refilled with wastewater slurry 50 or during the normal operation of the wastewater treatment system 10. The purge is done forwards and backwards for a brief pre-determined time period in each direction. The contents of the purge are diverted 58 to a degasification chamber 20.

A small amount of a defoaming agent may be added 67 to the oxidized and disinfected slurry before it enters the electrocoagulation cell 18 to minimize or eliminate foaming in the primary settling tank 22. The defoaming agent may also help with gas removal from the flocculated slurry exiting the electrocoagulation cell 18.

The flocculated slurry is piped 58 to a degasification chamber 20. The degasification chamber 20 utilizes known falling film technology to facilitate residual gas removal. In one embodiment of the invention, ambient air is forced 61 into the degasification chamber's vent lines using a blower. This ambient air dilutes the residual gases and gases produced during electrolysis. The diluted air is vented 65 to the atmosphere. The degassed flocculated slurry enters a settling tank 22 where floc-containing sludge is precipitated or allowed to settle at the bottom.

Since the sludge or agglomerated solids are heavier, it separates from the substantially clarified supernatant and it settles at the bottom of the settling tank 22, causing the substantially clarified supernatant to be displaced upward. The sludge may be discharged 59a to an optional sludge collection tank (not shown). The substantially clarified supernatant may be passed 60 into a clarifying tank 24 in fluid communication with the settling tank 22. The substantially clarified supernatant may be allowed to settle further in the clarifying tank 24. Residual sludge may be allowed to settle to the bottom of the clarifying tank 24. The residual sludge may also be discharged 59*b* to the optional sludge collection tank.

Both the settling tank 22 and the clarifying tank 24 have a pair of sloped or conical sidewalls, 22*a*, 24*a*. The heavy sludge slides down the sidewalls 22*a*, 24*a* and settles to the bottom of the tanks 22, 24. Both the settling tank 22 and the clarifying tank 24 further comprise basal ports that connect to discharge pipes. These discharge pipes may be enjoined and the enjoined or common discharge pipe withdraws or removes 59*c* the flocculated sludge from the settling tank 22 and the clarifying tank 24.

The sludge withdrawal 59*c* may be controlled by one or more valves on the common discharge pipe. When the turbidity level of the sludge discharged equals a pre-determined optimal low value, the valves may be automatically shut off and further sludge discharge 59*c* is halted.

Referring back to FIG. 1, in one embodiment of the invention, a turbidimeter 26 is installed on the common discharge pipe. Turbidity meters or turbidimeters measure water clarity or turbidity. Turbidity is an aggregate water property caused by suspended particles in water. At high concentrations, turbidity is perceived as cloudiness, haze, or an absence of clarity in the water. Turbidity analysis is an optical measurement of scattered light. When light is passed through a water sample, particles in the light path change the direction of the light, scattering it. If the turbidity is low, most of the light will continue in the original direction. Light scattered by the particles allows the particles to be detected in the water. When the turbidimeter 26 installed on the common discharge pipe detects a pre-programmed low reading, the valves on the common discharge pipe are automatically closed. This stops further discharge of the sludge 59*c*. The sludge from the clarifying tank 24 may be combined with sludge from the settling tank 24 to form a 2-3 wt % total solids waste stream to be off loaded from the wastewater treatment system 10 by the system operator. The substantially clarified supernatant may be discharged 62 as a treated or disinfected effluent.

In another embodiment of the invention, the sludge may be discharged 59*c* to and collected in a polymerization tank or vessel (not shown). Cationic polymers may be either manually or mechanically introduced into the polymerization tank. The polymers may promote dewaterability of the flocculated sludge producing one or more large polymerized clusters. These large polymerized clusters may contain a greater percentage, from 8%-25% more, of solids. The polymerized clusters may be drier and may have reduced weight in comparison to the flocculated sludge. Beneficially, the volume of the sludge comprising the polymerized clusters may be reduced by up to 75% which in turn may reduce the costs associated with the treatment and disposal of the effluent. The polymerized clusters may be filtered in a filtration unit (not shown).

The filtration unit may comprise a multiple station filtration and drying unit. The filtration and drying unit is a compact unit for easily and safely handling captured particulate waste, unlike the currently available wastewater treatment systems that require multiple pieces of equipment to provide the same end result. In one embodiment, the multiple station filtration and drying unit comprises a support grid configured to multiple industry standard filter bags. One or more processes comprising introducing the fluid to be treated into the filter bags, dewatering the fluids, compacting and drying the particulate mass is accomplished in-situ to the operation of the multiple station filtration and drying unit. The multiple station filtration and drying unit further comprises a dedicated filter bag removal or discharge station for removing soiled but dry and liquid-free filter bags comprising compacted particulate mass. By using a clear cover and a safety interlock mechanism to operate the cover at the filter bag discharge station, an operator's exposure to biological hazards, inherent to wastewater treatment facilities, is controlled. The soiled or spent filter bags can be removed and replaced with a clean filter bag while the multiple station filtration and drying unit is in operation.

In yet another embodiment of the invention, the sludge may be discharged 59*c* to a centrifuge unit (not shown). Solid/liquid separation may be achieved by using a centrifuge without requiring the addition of polymer to coagulate the particles, followed by subsequent filtration. The discharged sludge stream 59*c* from the settling tank 22 and the clarifying tank 24 comprises agglomerated solids (2-3 wt % solids), and since it is sufficiently heavier, it may be further separated from interstitial water in a centrifuge to form two separate streams: a fluid stream relatively devoid of solids and a sludge with greater than 10 wt % solids. The solids discharge is not considered a bio-hazard and it may be then combined with normal trash/waste. Special internal scraper knives may be used to physically dislodge the solids from the centrifuge and drop the solids into a container. The container may comprise waterproof cardboard for handling. The centrifuge unit may remove the solids in a batch mode and it may further comprise a recirculation tank that provides the 2-3 wt % feed stream.

Referring back to FIG. 1, the wastewater treatment system 10 may further comprise a dechlorination unit 28. The dechlorination 28 comprises a chemical injection pump or a metering pump 29. The substantially clarified supernatant may be dechlorinated 63 by addition of optimal amounts of one or more chemicals. In one embodiment, sodium bisulfite, sodium sulfite, sodium thiosulfate or sulfur dioxide may be injected 63 into the substantially clarified supernatant by the metering pump 29 at concentrations which ensure that the chlorine content of the substantially clarified effluent may meet the requirements of Resolution MEPC159(55) of the International Maritime Organization for effluent release to the marine environment without further processing. The dechlorinated effluent may be environmentally safe and substantially free of residual chlorine. The dechlorinated effluent may be gravity drained overboard through piping. As shown in FIG. 1, the system 10 may comprise a stainless steel centrifugal overboard pump 30 to discharge 64 the dechlorinated effluent overboard. The discharged effluent may comprise less than 100 cfu/100 ml coliform. BOD less than about 25 mg/L, COD less than 120 mg/L and TSS less than 35 mg/L.

Test Results:

Land-based test was carried out at a Wastewater Treatment Plant in Katy, Tex. Katy is a suburb of Houston. The plant handles 3.2 million gallons per day (MGD) with maximum capacity of 13.3 MGD. The marine wastewater treatment system was operated under conditions and testing protocol adopted by the Marine Environment Protection Committee (MEPC) of the International Maritime Organization (IMO) in resolution MEPC.2 (VI) Recommendation of International Effluent Standards and Guidelines for Performance Tests for Sewage Treatment Plants in 1976 and modifications as adapted at MEPC.159(55) on Oct. 13, 2006. All operation of the system was carried out by trained personnel. Proper operation and monitoring of the system during the 12 day test was done by these same personnel. System operation and lab results were authenticated by an independent third party company (in this case, Bureau Veritas).

The tests were carried out at specific sewage qualities. The influent ("A") was fresh sewage consisting of faecal matter, urine, toilet paper, and flush water; to which sludge was added to achieve sewage with a minimum total suspended solids concentration appropriate for the number of persons and hydraulic loading for which the sewage treatment plant will be certified. The wastewater treatment system tested was designed for a hydraulic loading of 13.6 cu. M/day. The duration of the test period was 12 days to capture all operational conditions. Samples and operating data were obtained after steady-state conditions had been reached by the wastewater treatment system.

Sewage of required quality was provided from the wastewater plant and fed to the wastewater treatment system on a continuous basis. There were 232 samples taken over 12 days at prescribed intervals; 94 were used to determine Fecal Coliform concentration (half inlet and half effluent) and 138 (half inlet and half effluent) to determine TSS, BOD5, COD, pH, and chlorine. Fecal Coliform samples were conveyed by courier to the North Water District Laboratory Services, Inc. (NWDLS) two separate times a day so analysis could be performed within 8 hours from sample collection time. Samples for the other analysis were taken by courier once per day to NWDLS. All sample collection and transfer complied with standard chain of custody. NWDLS is recognized by the United States Environmental Protection Agency (EPA), and accredited by the National Environmental Laboratory Accreditation Program and the Texas Commission on Environmental Quality.

The influent for the entire test met the requirements of Resolution MEPC.159(55). As shown in Table 1 below, the TSS geometric mean was 888.6 mg/L and minimum value for the entire 12 day test was 618.0 mg/L.

TABLE 1

Influent Stream

| | | | |
|---|---|---|---|
| Geo Mean | 888.6 | 959.6 | 272.5 | 6.8 |
| Minimum | 618.0 | 658.0 | 186.0 | 6.2 |
| Maximum | 1350.0 | 1376.0 | 366.0 | 7.3 |

| | TSS (mg/L) | COD (mg/L) | BOD (mg/L) | pH |
|---|---|---|---|---|
| MEPC 159 (55) standard Req. | Min. 500 | | | |

A (Wastewater Influent)

After the wastewater was treated in accordance with the one or more embodiments of the method described earlier, the dechlorinated effluent ("B") was tested. The effluent met the criteria of Resolution MEPC.159(55). This effluent represents the overboard effluent exiting the wastewater treatment process. As shown in Table 2 below the geometric mean value for Fecal Coliform was 8.7 number of colony forming units per 100 ml, well below the 100 required geometric mean value. Other analysis of system effluent are shown in Table 2 and confirm the geometric mean for TSS was 16.3 mg/L, COD value was 30.3 mg/L, BOD5 value was 7.5 mg/L, pH was 7.0 with a range of 6.1 to 7.7, and Chlorine ranged from 0.01 to 0.40. These results meet criteria of MEPC.159(55).

TABLE 2

System Effluent

| | | | | | | |
|---|---|---|---|---|---|---|
| Geo Mean | 8.7 | 16.3 | 30.3 | 7.5 | 7.0 | 0.08 |
| Minimum | 1.0 | 6.4 | 22.0 | 1.0 | 6.1 | 0.01 |
| Maximum | 2200.0 | 36.0 | 38.0 | 18.0 | 7.7 | 0.40 |

| | FC (#/100 ml) | TSS (mg/L) | COD (mg/L) | BOD (mg/L) | pH | Cl2 (mg/L) |
|---|---|---|---|---|---|---|
| MEPC 159 (55) standard Req. | 100 | 35 | 125 | 25 | 6 to 8.5 | Max. 0.5 |

B (Dechlorinated Effluent)

Although not shown herein, the wastewater flow may be modified based on system optimization so long as the modification complies with the spirit of the invention, as defined by the claims. Additional process equipment, such as pumps, pipes or additional electrolytic cells or filtration units, may be employed throughout the processes described herein.

It is contemplated that the embodiments described herein are used at marine facilities, such as marine vessels, including ships and platforms, for example. Tight quarters in the marine facilities generally make installation of wastewater treatment systems difficult, if not impossible for many commercial applications. However, embodiments of the invention further provide a purification system having a small footprint and overall size, thereby easing installation concerns.

While the foregoing is directed to embodiments of the present invention, other and further embodiments of the invention may be devised without departing from the basic scope thereof and the scope thereof is determined by the claims that follow. The inventions are not limited to the described embodiments, versions or examples, which are included to enable a person having ordinary skill in the art to make and use the inventions when the information in this patent is combined with available information and technology.

The invention claimed is:

1. A method for treating marine wastewater, the method comprising:

pumping a wastewater slurry into a wastewater collection tank, the slurry comprising suspended solid particles, organic and inorganic matter, bacteria and entrained gases;

automatically commencing routing the slurry by a macerator pump for maceration in response to a wastewater level sensor detecting a pre-determined upper threshold level of the slurry in the wastewater collection tank;

piping the macerated slurry to an electrolytic cell;

oxidizing and disinfecting the macerated slurry piped to the electrolytic cell;

adding a defoaming agent to the oxidized and disinfected slurry prior to piping it to an electrocoagulation cell;

facilitating, in the electrocoagulation cell, flocculation of the solid particles suspended in the oxidized and disinfected slurry;

periodically subjecting the electrocoagulation cell to an automated combined air and water purge, the purge flushing particulate contaminated accumulated on one more electrodes in the electrocoagulation cell;

routing the flocculated slurry to a primary settling tank for separation of a floc-containing sludge and a substantially clarified supernatant;

piping the substantially clarified supernatant to a secondary clarifying tank, the secondary clarifying tank having sloped walls to facilitate further separation of the sludge and the substantially clarified supernatant;

withdrawing the sludge through basal ports on the settling and clarifying tanks;

continually measuring turbidity levels of the withdrawn sludge, the sludge withdrawal automatically halted on the condition that the turbidity level measurement equals a pre-determined value; and discharging the substantially clarified supernatant from the clarifying tank as a treated effluent.

2. The method of claim 1, further comprising diverting a stream of macerated slurry to the wastewater collection tank, the macerated slurry stream continually mixed with the wastewater slurry in the wastewater collection tank to maintain a homogeneous wastewater blend.

3. The method of claim 1, further comprising contacting the macerated slurry with a controlled amount of an oxidizing agent in the electrolytic cell.

4. The method of claim 3, wherein the oxidizing agent is generated from seawater or brine.

5. The method of claim 1, further comprising discharging the treated effluent overboard a marine vessel.

6. The method of claim 5, further comprising injecting one or more chemicals to the treated effluent prior to discharge to neutralize residual chlorine to less than 0.5 mg/L.

7. The method of claim 6, wherein the discharged effluent comprises less than 25 mg/L Biochemical Oxygen Demand (BOD).

8. The method of claim 6, wherein the discharged effluent comprises less than 35 mg/L Total Suspended Solids (TSS).

9. The method of claim 6, wherein the discharged effluent comprises less than 120 mg/L Chemical Oxygen Demand (COD).

10. The method of claim 6, wherein the discharged effluent comprises less than 100 cfu/100 ml coliform.

11. A method for treating marine wastewater, the method comprising:

pumping a wastewater slurry into a wastewater collection tank, the slurry comprising suspended solid particles, organic and inorganic matter, bacteria and entrained gases;

automatically commencing routing the slurry by a macerator pump for maceration in response to a wastewater level sensor detecting a pre-determined upper threshold level of the slurry in the wastewater collection tank;

diverting a stream of macerated slurry back to the wastewater collection tank and piping a remaining portion of the macerated slurry to an electrolytic cell;

continually mixing, using a mixing pump, the macerated slurry stream with the slurry in the wastewater collection tank to maintain a homogeneous blend;

oxidizing and disinfecting the remaining macerated slurry in the electrolytic cell using a controlled volume of seawater, the electrolysis further producing one or more gases;

adding a defoaming agent to the oxidized and disinfected slurry prior to piping it to an electrocoagulation cell;

facilitating, in the electrocoagulation cell, flocculation of the solid particles suspended in the oxidized and disinfected slurry;

periodically subjecting the electrocoagulation cell to an automated combined air and water purge, the purge flushing particulate contaminants accumulated on one or more electrodes in the electrocoagulation cell;

facilitating degasification of residual or entrained gases, utilizing a falling film technology, by piping the flocculated slurry and the particulate contaminants to a degasification chamber;

transferring the degasified flocculated slurry and the particulate contaminants to a primary settling tank having sloped sidewalls for separation of a floc-containing sludge and a substantially clarified supernatant;

piping the substantially clarified supernatant to a secondary clarifying tank having sloped sidewalls to facilitate further separation of the sludge and the substantially clarified supernatant;

withdrawing the sludge through basal ports on the settling and clarifying tanks;

continually measuring turbidity levels of the withdrawn sludge, the sludge withdrawal automatically halted on the condition that the turbidity level measurement equals a pre-determined value; and discharging the substantially clarified supernatant from the clarifying tank as a treated effluent, wherein one or more chemicals are injected in the effluent prior to discharge to neutralize residual chlorine.

12. The method of claim 11, further comprising controlling the dosage of the chemicals injected in the treated effluent.

13. The method of claim 11, further comprising forcing ambient air into the degagification chamber, using a blower, to dilute the one or more gases entrained in the flocculated slurry.

14. The method of claim 11, further comprising disposing the sludge in the sludge collection tank at an offshore location.

15. The method of claim 11, wherein the macerator pump finely grinds the solid particles suspended in the wastewater slurry to facilitate disinfection in the electrolytic cell.

* * * * *